United States Patent
Nilsson et al.

(10) Patent No.: US 8,804,836 B2
(45) Date of Patent: Aug. 12, 2014

(54) VIDEO CODING

(75) Inventors: Mattias Nilsson, Sundbyberg (SE); Renat Vafin, Tallinn (EE); Soren Vang Andersen, Esch-sur-Alzette (LU)

(73) Assignee: Skype, Dublin (IE)

( * ) Notice: Subject to any disclaimer, the term of this patent is extended or adjusted under 35 U.S.C. 154(b) by 273 days.

(21) Appl. No.: 13/274,739

(22) Filed: Oct. 17, 2011

(65) Prior Publication Data

US 2013/0044804 A1 Feb. 21, 2013

(30) Foreign Application Priority Data

Aug. 19, 2011 (GB) .................................. 1114323.7

(51) Int. Cl.
| | | |
|---|---|---|
| *H04N 7/12* | (2006.01) | |
| *H04N 11/02* | (2006.01) | |
| *H04N 11/04* | (2006.01) | |
| *H04N 7/50* | (2006.01) | |
| *H04N 7/26* | (2006.01) | |

(52) U.S. Cl.
CPC ............. *H04N 7/50* (2013.01); *H04N 7/26244* (2013.01)
USPC .................................. 375/240.2; 375/240.02

(58) Field of Classification Search
USPC .......... 375/240–241, E7.153, E7.128, E7.154
See application file for complete search history.

(56) References Cited

U.S. PATENT DOCUMENTS

| | | |
|---|---|---|
| 7,317,759 B1 | 1/2008 | Turaga et al. |
| 2002/0064228 A1 | 5/2002 | Sethuraman et al. |
| 2003/0012202 A1 | 1/2003 | Fukutomi |
| 2004/0114817 A1 | 6/2004 | Jayant et al. |
| 2005/0053299 A1 | 3/2005 | Fuchs et al. |
| 2005/0135484 A1 | 6/2005 | Lee et al. |
| 2005/0213657 A1 | 9/2005 | Kodama et al. |
| 2005/0237987 A1 | 10/2005 | Wang et al. |

(Continued)

FOREIGN PATENT DOCUMENTS

| | | |
|---|---|---|
| EP | 1439712 | 7/2004 |
| EP | 2096874 | 9/2009 |

(Continued)

OTHER PUBLICATIONS

"International Search Report and Written Opinion", Application No. PCT/EP2012/062163, (Aug. 7, 2012), 15 pages.

(Continued)

*Primary Examiner* — Sath V Perungavoor
*Assistant Examiner* — Paul Myers, III
(74) *Attorney, Agent, or Firm* — Sonia Cooper; Jim Ross; Micky Minhas

(57) ABSTRACT

A method comprising: for each target image portion to be encoded in a frame, selecting one of a set of encoding modes by optimizing a function comprising an estimate of distortion for the target image portion and a measure of bit rate required to encode the target image portion, encoding the target image portion into the encoded video stream using the selected mode. The encoded video stream is transmitted over a lossy channel. An error propagation distortion map is maintained, which comprises a plurality of error propagation distortion values mapping to respective frame partitions, the error propagation distortion values being based on previous encoding mode selections. The estimate of distortion used to select the encoding mode for each of the target image portions is based on a corresponding portion from the error propagation distortion map, and that corresponding portion is constrained to being co-located with the target image portion.

27 Claims, 5 Drawing Sheets

(56) References Cited

U.S. PATENT DOCUMENTS

| | | |
|---|---|---|
| 2006/0239348 A1 | 10/2006 | Zhang |
| 2006/0291558 A1 | 12/2006 | Schreier |
| 2007/0160137 A1* | 7/2007 | Guo et al. ............... 375/240.1 |
| 2008/0112481 A1 | 5/2008 | Hsaing et al. |
| 2008/0247469 A1 | 10/2008 | Vadapalli et al. |
| 2008/0310502 A1 | 12/2008 | Kim et al. |
| 2009/0086816 A1 | 4/2009 | Leontaris et al. |
| 2009/0086827 A1 | 4/2009 | Wu et al. |
| 2009/0190661 A1 | 7/2009 | Nagori |
| 2009/0219991 A1 | 9/2009 | Po et al. |
| 2009/0252227 A1 | 10/2009 | NepomucenoLeung et al. |
| 2010/0161329 A1 | 6/2010 | Chung et al. |
| 2010/0226262 A1 | 9/2010 | Liu et al. |
| 2010/0238997 A1 | 9/2010 | Yang et al. |
| 2010/0239015 A1 | 9/2010 | Wang et al. |
| 2010/0278275 A1* | 11/2010 | Yang et al. ............. 375/240.27 |
| 2010/0303148 A1 | 12/2010 | Hiron |
| 2010/0316126 A1 | 12/2010 | Chen et al. |
| 2011/0090960 A1* | 4/2011 | Leontaris et al. ........ 375/240.12 |
| 2011/0119565 A1 | 5/2011 | Chang et al. |
| 2011/0286516 A1 | 11/2011 | Lim et al. |
| 2012/0069927 A1 | 3/2012 | Oyman et al. |
| 2012/0093017 A1 | 4/2012 | Liu et al. |
| 2012/0327997 A1 | 12/2012 | Nilsson |
| 2012/0327998 A1 | 12/2012 | Nilsson |
| 2012/0328002 A1 | 12/2012 | Vafin |
| 2013/0058394 A1 | 3/2013 | Nilsson |
| 2013/0058395 A1 | 3/2013 | Nilsson |
| 2013/0058405 A1 | 3/2013 | Zhao |
| 2013/0223513 A1 | 8/2013 | Chen et al. |

FOREIGN PATENT DOCUMENTS

| | | |
|---|---|---|
| EP | 2184925 | 5/2010 |
| EP | 2230849 | 9/2010 |
| GB | 2167267 | 5/1986 |
| GB | 2492329 | 1/2013 |
| JP | 10145794 | 5/1998 |
| WO | WO-2004004359 | 1/2004 |
| WO | WO-2006042323 | 4/2006 |
| WO | WO-2007015126 | 2/2007 |
| WO | WO-2007084475 | 7/2007 |
| WO | WO-2012171113 | 12/2012 |

OTHER PUBLICATIONS

"International Search Report and Written Opinion", Application No. PCT/EP2012/062164, (Jul. 30, 2012), 14 pages.

"International Search Report and Written Opinion", Application No. PCT/EP2012/062162, (Aug. 7, 2012), 17 pages.

Chao, Yi-Chin et al., "An Approximate Square Criterion for H.264/AVC Intra Mode Decision", *Multimedia and Expo. 2888 IEEE International Conference on. IEEE Piscataway. NJ. USA*, (Jun. 23, 2008), pp. 333-336.

Chen, Quqing et al., "Attention-Based Adaptive Intra Refresh for Error-Prone Video Transmission", *video transmission, IEEE Communications Magazine, IEEE Service Center*, Piscataway, US, vo 1 . 44, No. 1, (Jan. 1, 2007), pp. 52-60.

Lim, Keng-Pang et al., "JM text: Description of Joint Model Reference Encoding Methods and Decoding Concealment Methods", *24. JVT Meeting; 81. MPEG 29.6.2887-5.7.2886*; Geneva. CH;*(Joint Video Team of ISO/IEC JTC1/SC29/WG11 and ITU-T SG . 16*, (Jul. 3, 2007), 58 pages.

Liu, Meng et al., "Rate Control Based on Intermediate Description", *Visual Communications and Image Processing*; Nov. 7, 2010-Jul. 14, 2010; Huang Shan, an Hu I , China, (Jul. 11, 2012), 10 pages.

Nyamweno, S et al., "Error Resilient Video Coding Via Weighted Distortion", *Multimedia and Expo, 2009. ICME 2009. IEEE International Conference on, IEEE*, Piscataway, NJ, USA, (Jun. 28, 2009), pp. 734-737.

Rolin, Ruan "A Novel Intra Refreshment Algorithm for ROI", *Multimedia and Information Technology, 2008. MMIT '08. International Conference on, IEEE*, Picsataway, NJ, USA, (Dec. 30, 2008), pp. 62-65

Sarwer, Mohammed G., et al., "Enhanced Low Complex Cost Function for H.264/AVC Intra Mode Decision", *Multimedia and Signal Processing (CMSP). 2811 International Conference on. IEEE*, (May 14, 2011), pp. 46-50.

Song, Mingzhou et al., "Motion Estimation in DCT Domain", *IEEE*, vol. 5, (1996),pp. 670-674.

Sullivan, Gary J., et al., "Rate-Distortion Optimization for Video Compression", *IEEE Signal Processing Magazine*, 15(6), (Nov. 1, 1998), pp. 74-90.

Wang, Yi et al., "Off-Line Motion Description for Fast Video Stream Generation in MPEG-4 AVC/H.264", *2006 IEEE International Conference on Multimedia and Expo (ICME 2006)*, Toronto, Ont., Canada, *IEEE*, Piscataway, NJ, USA, (Jul. 1, 2006), pp. 685-688.

Wiegand, Thomas et al., "Error Resilient Video Transmission Using Long-Term Memory Motion-Compensated Prediction", *IEEE Journal on Selected Areas in Communications, IEEE Service Center*, Piscataway, US, val. 18, No. 6, (Jun. 1, 2000), pp. 1050-1062.

Xiong, Bing et al., "A New Multiplication-Free Block Matching Criterion", *IEEE transactions on Circuits and Systems for Video Technology. IEEE Service Center*. Piscataway, NJ. US. vo 1 . 18. No. 18, (Oct. 1, 2008), pp. 1441-1446.

Zhang, Yuan et al., "Error Resilience Video Coding in H.264 Encoder with Potential Distortion Tracking", *Image Processing, 2004. ICIP '04. 2004 International Conference on Singapore* Oct. 24-27, 2004, Piscataway, NJ, USA,*IEEE*, val. 1, (Oct. 24, 2004), pp. 163-166.

"Search Report", GB Application No. 1115201.4, (Feb. 12, 2013), 3 pages.

"Search Report", GB Application No. 1115209.7, (Feb. 12, 2013), 3 pages.

"International Search Report and Written Opinion", Application No. PCT/US2012/053581, (Dec. 11, 2012), 14 pages.

"International Search Report and Written Opinion", Application No. PCT/US2012/053850, (Dec. 5, 2012), 12 pages.

"International Search Report and Written Opinion", Application No. PCT/US2012/053583, (Dec. 5, 2012), 13 pages.

"International Search Report and Written Opinion", Application No. PCT/US2012/051507, (Dec. 17, 2012), 13 pages.

Alwihaibi, Abdullah et al., "Computation of the Residual Packet Loss Probability in a Binary Multicast Tree", (2003), 4 pages.

Chen, Chih-Ming "Error Resilience Transcoding Using Prioritized Intra-Refresh for Video Multicast Over Wireless Networks", (2005), 4 pages.

Naghdinezhad, Amir et al., "Distortion Estimation for Reference Frame Modification Methods", *19th European Signal Processing Conference (EUSIPCO 2011)*, (2011), 5 pages.

Stockhammer, Thomas et al., "Rate-Distortion Optimization for JVT/H.26L Video Coding in Packet Loss Environment", *International Workshop on Packet Video, 2002*, (Apr. 24, 2002), 12 pages.

Vadapalli, Sarat C., "Low-Complexity Frame-Level Joint Source-Channel Distortion Optimal, Adaptive Intra Refresh", *2008 IEEE 10th Workshop on Multimedia Signal Processing*, (2008), pp. 474-480.

Vadapalli, Sarat C., et al., "Efficient Alternative to Intra Refresh Using Reliable Reference Frames", *International Conference on Multimedia and Expo, 2007 IEEE*, (2007), 4 pages.

Zhang, Yuan et al., "Joint Source-Channel Rate-Distortion Optimization for H.264 Video Coding Over Error-Prone Networks", (2007), pp. 445-454.

Zhang, Yuan et al., "Optimum End-to-End Distortion Estimation for Error Resilient Video Coding", (2004), 4 pages.

"Search Report", GB Application No. 1110759.6, (Oct. 18, 2012), 3 pages.

"Search Report", GB Application No. 1110760.4, (Oct. 24, 2012), 4 pages.

"Search Report", GB Application No. 1110763.8, (Oct. 18, 2012), 3 pages.

"Search Report", GB Application No. 1114323.7, (Dec. 10, 2012), 3 pages.

(56) References Cited

OTHER PUBLICATIONS

"Final Office Action", U.S. Appl. No. 13/274,881, Mar. 18, 2014, 32 pages.
"Non-Final Office Action", U.S. Appl. No. 13/274,922, Jan. 16, 2014, 18 pages.
"Non-Final Office Action", U.S. Appl. No. 13/275,046, Jan. 16, 2014, 21 pages.
"Non-Final Office Action", U.S. Appl. No. 13/274,865, Jan. 7, 2014, 24 pages.
"Non-Final Office Action", U.S. Appl. No. 13/274,881, Dec. 19, 2013, 29 pages.

* cited by examiner

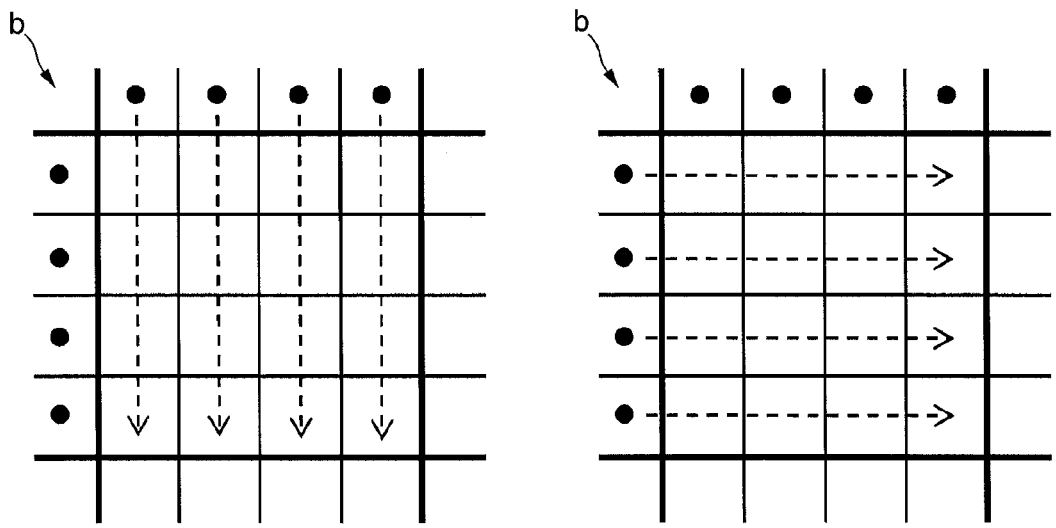
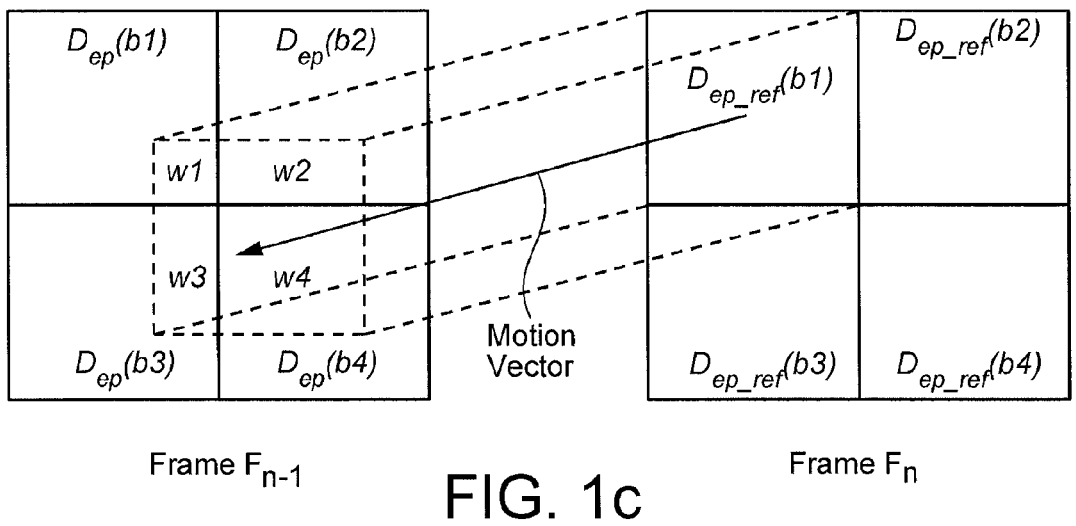
FIG. 1b
FIG. 1c

VIDEO CODING

RELATED APPLICATION

This application claims priority under 35 U.S.C. §119 or 365 to Great Britain Application No. GB 1114323.7, filed Aug. 19, 2011. The entire teachings of the above application are incorporated herein by reference.

TECHNICAL FIELD

The present invention relates to balancing a trade-off between bitrate and distortion when selecting an encoding mode for encoding portions of a video signal.

BACKGROUND

A stream of video data to be encoded is illustrated schematically in FIG. 1a. The stream comprises multiple frames (F) each representing the video image at a different respective moment in time. As will be familiar to a person skilled in the art, for the purpose of encoding, each frame (F) is divided into portions and each portion may also be subdivided into smaller sub-portions, each portion or sub-portion comprising a plurality of pixels. For example, according to one terminology each frame of a video stream to be encoded is divided into macroblocks (MB) and each macroblock is sub-divided into blocks or subblocks (b), each block or subblock comprising multiple pixels. Each frame may also be divided into independently decodable slices (S), each slice comprising one or more macroblocks. N.B. the divisions shown in FIG. 1a are only schematic for illustrative purposes and it will be appreciated that these are not necessarily meant to correspond to any actual encoding scheme—e.g. each frame is likely to contain a larger number of macroblocks.

A goal of a video codec is to reduce the bit rate needed to transmit a video signal, while maintaining highest possible quality. This goal is achieved by exploiting statistical redundancies (similarities in the video signal) and perceptual irrelevancies (related to sensitivity of human visual system).

Most of today's video codecs are based on an architecture that includes prediction of pixel blocks from other pixel blocks, transform of prediction residuals, quantization of transform coefficients, and entropy coding of quantization indices. These steps contribute to reducing redundancies and irrelevancies.

The prediction can typically be performed from pixels in video frames other than the current frame (inter prediction) and from pixels in the same frame (intra prediction). That is, if encoded using intra frame encoding then a block, subblock or other portion of the frame (the target block or portion) is encoded relative to another block, subblock or image portion in the same frame (the reference block or portion); and if encoded using inter frame encoding then the target block or portion is encoded relative to a reference block or portion in another frame. This process is commonly referred to as prediction or prediction coding. The inter or intra prediction module will thus generate a prediction, e.g. in the form of an indication of a neighbouring block or subblock in the case of intra frame encoding and/or a motion vector in the case of inter frame encoding. Typically the encoder also generates a residual signal representing a "left over" difference between the predicted block and the actual block (or predicted and actual subblocks, etc.). The residual, motion vectors and any required data associated with the intra prediction are then output into the encoded video stream, typically via further coding stages such as a quantizer and entropy encoder. Hence most blocks in the video can be encoded in terms of a difference between blocks, which requires fewer bits to encode than encoding absolute pixel values and hence saves on bitrate. Intra prediction encoding typically requires more bits than inter prediction, though still represents a saving over encoding absolute values. Details of suitable inter and intra encoding techniques for video will be familiar to a person skilled in the art.

Modern codecs allow the use of different prediction encoding modes for different portions within a frame. The possibility of having different coding options increases the rate-distortion efficiency of a video codec. The optimal coding representation has to be found for every frame region. Typically, such region is a macroblock, e.g. of 16×16 pixels. I.e. so it is possible for an intra prediction or inter prediction mode to be selected individually for each macroblock, so that different macroblocks within the same frame can be encoded with different modes. It is also possible in some codecs to use different modes based on different levels of partitioning of macroblocks, e.g. selecting between a higher complexity mode in which a separate prediction is performed for each 4×4 subblock within a macroblock or a lower complexity mode in which prediction is performed based on only 8×8 or 8×16 blocks or even whole macroblocks. The available modes may also include different options for performing prediction. For example as illustrated schematically in FIG. 1b, in one intra mode the pixels of a 4×4 subblock (b) may be determined by extrapolating down from the neighbouring pixels from the subblock immediately above, or by extrapolating sideways from the subblock immediately to the left. Another special prediction mode called "skip mode" may also be provided in some codecs, which may be considered as an alternative type of inter mode. In skip mode (PSkip) the target's motion vector is inferred based on the motion vectors to the top and to the left and there is no encoding of residual coefficients. The manner in which the motion vector is inferred is consistent with motion vector prediction, thus the motion vector difference is zero and so it is only required to signal that the macroblock is a skip block.

A coding representation may include block partition information, prediction mode, motion vector, quantization accuracy, etc. The optimal coding option depends on video content, bit rate, earlier coding decisions, etc. The accuracy of quantization of transform coefficients is typically chosen to meet a bit rate constraint. Furthermore, distortion should be minimized.

For example, the H.264 video coder provides a great flexibility in choosing the prediction mode. For inter prediction of the luma component, a macroblock of 16×16 pixels can be represented as one block of 16×16 pixels, or two blocks of 16×8 pixels, or two blocks of 8×16 pixels, or four blocks of 8×8 pixels. Further, an 8×8 block can be represented as one block of 8×8 pixels, or two subblocks of 8×4 pixels, or two subblocks 4×8 pixels, or four subblocks of 4×4 pixels. The inter prediction is tried for each allowed partition of a macroblock. The inter prediction of a block is represented by indexing the reference frame(s) and the motion vector(s) (spatial shift from the reference block in the respective reference frame), which typically are estimated with sub-pixel precision. For intra prediction of the luma component, there are four possible modes for 16×16 blocks and nine possible modes for 4×4 subblocks. Further, there are four possible modes for chroma components. The best prediction mode is chosen by comparing the performance of inter and intra prediction modes.

The rate-distortion performance of a video codec such as H.264 AVC depends to a large extent on the performance of the macroblock mode selection o. That is, the procedure of determining whether the macroblock is best encoded, in terms of rate-distortion trade-offs, using e.g. intra mode or inter mode. From a robustness perspective, intra coded macroblocks are beneficial since they stop temporal error propagation (assuming the use of constrained intra prediction, i.e. intra prediction from inter predicted macroblocks is prohibited). However, intra coded macroblocks are generally more expensive in terms of rate compared to inter coded macroblocks, and thus it is important to introduce intra coded macroblocks systematically such that the distortion (e.g. average distortion) at the decoder is minimized given a certain bit budget and channel condition. Zhang et al., "Error resilience video coding in H.264 encoder with potential distortion tracking", (Proc. IEEE International Conference on Image Processing, pp. 163-166, 2004) (incorporated herein in its entirety) propose such a systematic framework to introduce intra coded macroblocks based on the minimization of the expected average sum of squared differences (SSD) at the decoder. By tracking the potential distortion Zhang et al are able to compute a bias term related to the expected error-propagation distortion (at the decoder) that is added to the source coding distortion when computing the cost for inter macroblocks within the encoder rate-distortion loop.

The rate-distortion performance optimization problem can be formulated in terms of minimizing distortion under a bit rate constraint R. A Lagrangian optimization framework is often used to solve the problem, according to which the optimization criterion may be formulated as:

$$J = D(m,o) + \lambda R(m,o), \quad (1)$$

where J represents the Lagrange function, D represents a measure of distortion (a function of mode o and macroblock m or macroblock sub-partition), R is the bitrate, and λ is a parameter defining a trade-off between distortion and rate. Commonly used distortion measures are sum of squared differences (SSD) between original and reconstructed pixels or sum of absolute differences (SAD) between the original and predicted pixels.

In this application solving the Lagrangian optimization problem means finding the encoding mode o which minimizes the Lagrange function J, where the Lagrange function J comprises at least a term representing distortion, a term representing bitrate, and a factor (the "Lagrange multiplier") representing a tradeoff between the two. As the encoding mode o is varied towards more thorough or better quality encoding modes then the distortion term D will decrease. However, at the same time the rate term R will increase, and at a certain point dependent on λ the increase in R will outweigh the decrease in D. Hence the expression J will have some minimum value, and the encoding mode o at which this occurs is considered the optimal encoding mode.

In this sense the bitrate R, or rather the term λR, places a constraint on the optimization in that this term pulls the optimal encoding mode back from ever increasing quality. The mode at which this optimal balance is found will depend on λ, and hence λ may be considered to represent a tradeoff between bitrate and distortion.

The Lagrangian optimization is commonly used in the process of choosing coding decisions, and is applied for every frame region (e.g. every macroblock of 16×16 pixels). Commonly, the distortion may be evaluated to account for all processing stages. These include prediction, transform, and quantization. Furthermore, in order to compute reconstructed pixels, steps of inverse quantization, inverse transform, and inverse prediction must be performed. SSD is often preferred as distortion criterion since it results in higher quality compared to SAD. Commonly, the rate also accounts for coding of all needed parameters, including parameters describing prediction and quantized transform coefficients.

In Zhang et al, the authors estimate the potential distortion in the decoder due not only to source coding but also to channel errors, i.e. also a likely distortion that would be experienced due to loss of data when the signal is transmitted over the channel. The estimated potential distortion is then indirectly used to bias the mode selection towards intra coding (if there is a probability of channel errors).

Zhang's "end-to-end" distortion expression is based on the sum of squared differences (SSD) distortion measure and assumes a Bernoulli distribution for losing macroblocks. The optimal macroblock mode $o_{opt}$ is given by:

$$o_{opt} = \operatorname*{argmin}_{o}(D_s(m, o) + D_{ep\_ref}(m, o) + \lambda R(m, o)), \quad (2)$$

where $D_s(m,o)$ denotes the SSD distortion between the original and reconstructed pixels for macroblock m and macroblock mode o, R the total rate, and λ the Lagrange multiplier relating the distortion and the rate term. $D_{ep\_ref}(m,o)$ denotes the expected distortion within the reference macroblock in the decoder due to error propagation. $D_{ep\_ref}(m,o)$ thus provides a bias term which bias the optimization toward intra coding if error propagation distortion becomes too large. $D_{ep\_ref}(m,o)$ is zero for the intra coded macroblock modes. The expression $D_s(m,o)+D_{ep\_ref}(m,o)+\lambda R(m, o)$ may be considered an instance of a Lagrange function J. $\operatorname{Argmin}_o$ outputs the value of the argument o for which the value of the expression J is minimum.

In Zhang et al. the term $D_{ep\_ref}(m,o)$ follows the motion of the objects and is calculated from a total distortion map using the current motion vectors. The total expected error propagation distortion map $D_{ep}$ is driven by the performance of the error concealment and is updated after each macroblock mode selection as:

$$D_{ep}(m(k),n+1) = (1-p)D_{ep\_ref}(m(k),n,o_{opt}) + p(D_{ec\text{-}rec}(m(k),n,o_{opt}) + D_{ec\text{-}ep}(m(k),n)), \quad (3)$$

where n is the frame number, m(k) denotes the $k^{th}$ sub-partition (i.e. block or subblock) of macroblock m, p the probability of packet loss, $D_{ec\text{-}rec}$ denotes the SSD between the reconstructed and error concealed pixels in the encoder, and $D_{ec\text{-}ep}$ the expected SSD between the error concealed pixels in the encoder and decoder.

In Zhang et al. $D_{ep}$ is stored on a 4×4 grid over each macroblock of the frame, i.e. 16 values of $D_{ep}$ per macroblock, so one value of $D_{ep}$ per 4×4 pixel subblock of each macroblock. As shown in FIG. 1c, the computation of $D_{ep\_ref}(m(k),o)$, i.e. the expected error-propagation reference distortion for a subblock k within the macroblock m of frame at time n, is then performed as a weighted sum of the values of $D_{ep}$ from four subblocks from a preceding frame from time n−1. The weights are determined from the motion vector for the block m in question. That is:

$$D_{ep\_ref}(m(k), n) = \sum_{i=1}^{4} w_i D_{ep}(q_i(k_i), n-1), \quad (4)$$

where the weights $w_i$ are proportional to the area of overlap and where $q_i(k_i)$ denotes subblock $k_i$ macroblock $q_i$ in a preceding frame n−1.

FIG. 1c provides an illustration of the computation of the expected error-propagation reference distortion from a motion vector and an expected error-propagation distortion map, with reference to exemplary subblocks b1 . . . b4 (in this example k corresponds to b1 and i counts through b1 . . . b4).

SUMMARY

On some platforms both the computational and memory resources may be very limited. This may be particularly relevant when encoding a video stream in real-time, i.e. a live video stream such as that of a video call, where the encoder has to dynamically encode the stream for transmission as-and-when it is received from the camera or such like. It would be desirable to provide a modification to known encoding, resulting in lower computational complexity and memory requirement at a sometimes affordable reduction in performance.

According to one aspect of the present invention, there is provided a method of encoding a video stream comprising a plurality of frames, the method comprising: for each of a plurality of target image portions to be encoded in a frame, selecting a preferred one of a set of encoding modes by optimizing a function comprising an estimate of distortion for the target image portion and a measure of bit rate required to encode the target image portion, and encoding the target image portion into the encoded video stream using the selected encoding mode; transmitting the encoded video stream over a lossy channel; and maintaining an error propagation distortion map which comprises a plurality of error propagation distortion values mapping to respective frame partitions, the error propagation distortion values being based on previous encoding mode selections; wherein the estimate of distortion used to select the encoding mode for each of the target image portions is based on a corresponding portion from the error propagation distortion map; and wherein said corresponding portion is constrained to being co-located with the target image portion.

For instance, by assuming zero motion for the computation of the error propagation reference distortion and the error concealment error propagation distortion, then both memory and computations can be saved since it is not necessary to compute the weights and only one value of expected error propagation distortion $D_{ep}$ need be stored per macroblock (e.g. instead of 16 if considering a 4×4 grid). Naturally, the end-to-end rate-distortion performance may drop, but in some conditions the inventors consider that the drop in quality will be small and acceptable.

In embodiments of the present invention, the method may comprise updating the error propagation distortion map after the encoding mode selection for the target image portions, and using the updated map to determine a subsequent encoding mode selection for each of the target image portions; wherein the update of the error propagation map may comprise a lower complexity calculation as a result of said constraint, relative to a case where the corresponding portion is based on a weighted sum of the error propagation distortion values from a plurality of said frame partitions.

Each of said frame partition may be the same size as a respective one of the target image portions, such that said corresponding portion may be one of said frame partitions.

The error propagation map may maintain only one error propagation distortion value per frame partition.

The estimate of distortion may be based on the error propagation distortion value of only the co-located one of said frame partitions.

Each of said image portions may be a macroblock, each of the frame partitions may be a macroblock, the error propagation map may maintain only one estimate of distortion value per macroblock, and the estimate of distortion may be based on the error propagation distortion value of only the co-located macroblock.

The estimate of distortion may comprise a first term representing source coding distortion, and a bias term representing an estimate of distortion that would be experienced due to loss over said channel; wherein the bias term may be based on said corresponding portion from the error propagation distortion map.

The bias term may be set equal to the error propagation distortion value for the corresponding co-located portion.

To maintain the error propagation distortion map, the error propagation distortion value for a frame partition of a current frame may be based on a contribution from the error propagation distortion value for that frame partition in a preceding frame and on a contribution representing an estimate of distortion that would be experienced due to concealment in event of loss over said channel.

The concealment term may be determined based on an assumption that, in event of loss of a target image portion, the concealment copies the target image portion directly from a co-located portion of a preceding frame.

The method may comprise determining a probability p that a packet will be lost over the channel, wherein the concealment term may be weighted by a factor of p.

The selected encoding mode $o_{opt}$ may be calculated by:

$$o_{opt} = \mathop{\mathrm{argmin}}\limits_{o}(D_s(m, o) + D_{ep\_ref}(m, o) + \lambda R(m, o)),$$

where $D_s(m,o)+D_{ep\_ref}(m,o)+\lambda R(m,o)$ is said function, $D_s$ is the first term, $D_{ep\_ref(m,o)}$ is the bias term, R(o) is the bitrate, $\lambda$ is a factor representing a trade-off between distortion and bitrate, and m is an index of the target image portion.

The encoding modes may comprise at least (i) an intra frame mode which encodes the target image portion relative to a reference image portion in the same frame, and (ii) an inter frame encoding mode which encodes the target image portion relative to a reference image portion in a previously encoded frame The error propagation distortion map may be calculated by:

$$D_{ep}(m, n+1) = \begin{cases} D_{ep}(m, n) + pD_{ec-rec}(m, n, o_{opt}) & \text{if } o_{opt} = \text{INTER} \\ pD_{ep}(m, n) + pD_{ec-rec}(m, n, o_{opt}) & \text{if } o_{opt} = \text{INTRA} \end{cases}$$

where m is the $m^{th}$ image portion, and $D_{ec-rec}$ is the contribution due to concealment.

The set of encoding modes may comprise a skip mode. The set of encoding modes may comprise modes using different partitions of the target image portion for at least one of intra and inter frame encoding.

According to another aspect of the present invention, there is provided a computer program product for encoding a video stream comprising a plurality of frames, the computer program product being embodied on a non-transitory computer-readable medium and comprising code configured so as when executed to perform the operations of: for each of a plurality of target image portions to be encoded in a frame, selecting a preferred one of a set of encoding modes by optimizing a function comprising an estimate of distortion for the target image portion and a measure of bit rate required to encode the target image portion, and encoding the target image portion into the encoded video stream using the selected encoding mode; transmitting the encoded video stream over a lossy channel; and maintaining an error propagation distortion map which comprises a plurality of error propagation distortion values mapping to respective frame partitions, the error propagation distortion values being based on previous encoding mode selections; wherein the estimate of distortion used to select the encoding mode for each of the target image portions is based on a corresponding portion from the error propagation distortion map; and wherein said corresponding portion is constrained to being co-located with the target image portion.

In embodiments, the code may configured so as when executed to perform operations in accordance with any of the above method features.

According to another aspect of the present invention, there is provided an apparatus for encoding a video stream comprising a plurality of frames, the apparatus comprising: an encoder arranged, for each of a plurality of target image portions to be encoded in a frame, to select a preferred one of a set of encoding modes by optimizing a function comprising an estimate of distortion for the target image portion and a measure of bit rate required to encode the target image portion, and to encode the target image portion into the encoded video stream using the selected encoding mode; and a transmitter for transmitting the encoded video stream over a lossy channel; and wherein the encoder is configured to maintain an error propagation distortion map which comprises a plurality of error propagation distortion values mapping to respective frame partitions, the error propagation distortion values being based on previous encoding mode selections, and the estimate of distortion used to select the encoding mode for each of the target image portions being based on a corresponding portion from the error propagation distortion map; and wherein the encoder is configured to constrain said corresponding portion to being co-located with the target image portion.

In embodiments, the encoder may be configured to perform operations in accordance with any of the above method features.

BRIEF DESCRIPTION OF THE DRAWINGS

For a better understanding of the present invention and to show how it may be put into effect, reference is made by way of example to the accompanying drawings in which:

FIG. 1b is a schematic representation of some intra prediction coding modes,

FIG. 1c is a schematic representation of a calculation of error propagation distortion.

DETAILED DESCRIPTION

Figure 2:
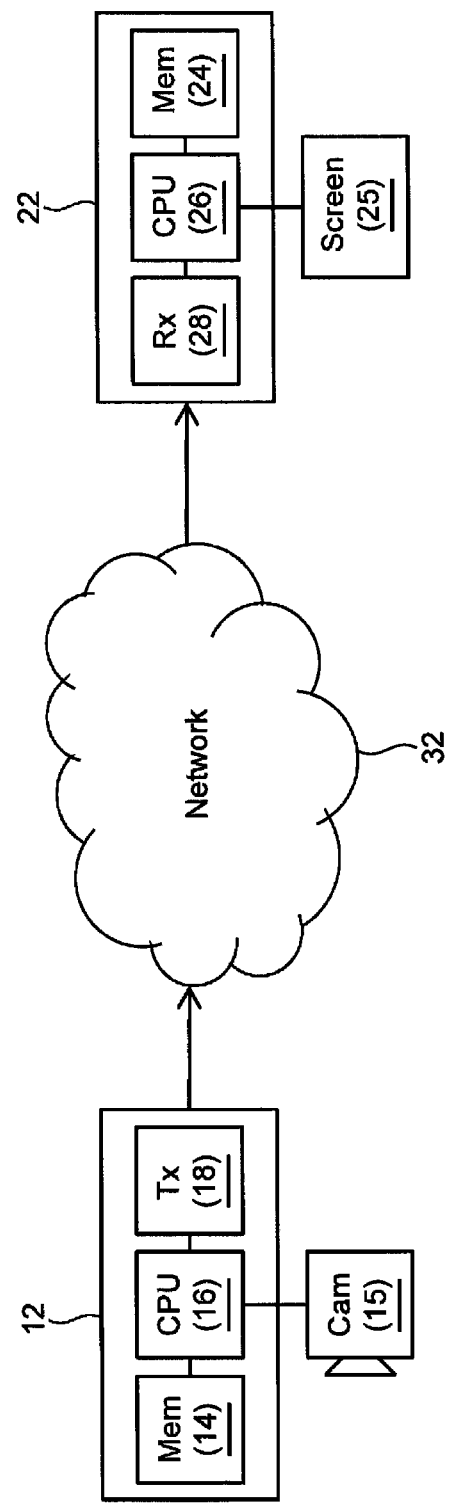
FIG. 2 is a schematic block diagram of a communication system.

An example communication system in which video coding may be employed is illustrated schematically in the block diagram of FIG. 2. The communication system comprises a first, transmitting terminal 12 and a second, receiving terminal 22. For example, each terminal 12, 22 may comprise a mobile phone or smart phone, tablet, laptop computer, desktop computer, or other household appliance such as a television set, set-top box, stereo system, etc. The first and second terminals 12, 22 are each operatively coupled to a communication network 32 and the first, transmitting terminal 12 is thereby arranged to transmit signals which will be received by the second, receiving terminal 22. Of course the transmitting terminal 12 may also be capable of receiving signals from the receiving terminal 22 and vice versa, but for the purpose of discussion the transmission is described herein from the perspective of the first terminal 12 and the reception is described from the perspective of the second terminal 22. The communication network 32 may comprise for example a packet-based network such as a wide area interne and/or local area network, and/or a mobile cellular network.

The first terminal 12 comprises a storage medium 14 such as a flash memory or other electronic memory, a magnetic storage device, and/or an optical storage device. The first terminal 12 also comprises a processing apparatus 16 in the form of a CPU having one or more cores; a transceiver such as a wired or wireless modem having at least a transmitter 18; and a video camera 15 which may or may not be housed within the same casing as the rest of the terminal 12. The storage medium 14, video camera 15 and transmitter 18 are each operatively coupled to the processing apparatus 16, and the transmitter 18 is operatively coupled to the network 32 via a wired or wireless link. Similarly, the second terminal 22 comprises a storage medium 24 such as an electronic, magnetic, and/or an optical storage device; and a processing apparatus 26 in the form of a CPU having one or more cores. The second terminal comprises a transceiver such as a wired or wireless modem having at least a receiver 28; and a screen 25 which may or may not be housed within the same casing as the rest of the terminal 22. The storage medium 24, screen 25 and receiver 28 of the second terminal are each operatively coupled to the respective processing apparatus 26, and the receiver 28 is operatively coupled to the network 32 via a wired or wireless link.

The storage medium 14 on the first terminal 12 stores at least a video encoder arranged to be executed on the processing apparatus 16. When executed the encoder receives a "raw" (unencoded) input video stream from the video camera 15, encodes the video stream so as to compress it into a lower bitrate stream, and outputs the encoded video stream for transmission via the transmitter 18 and communication network 32 to the receiver 28 of the second terminal 22. The storage medium on the second terminal 22 stores at least a video decoder arranged to be executed on its own processing apparatus 26. When executed the decoder receives the encoded video stream from the receiver 28 and decodes it for output to the screen 25. A generic term that may be used to refer to an encoder and/or decoder is a codec.

Figure 3:
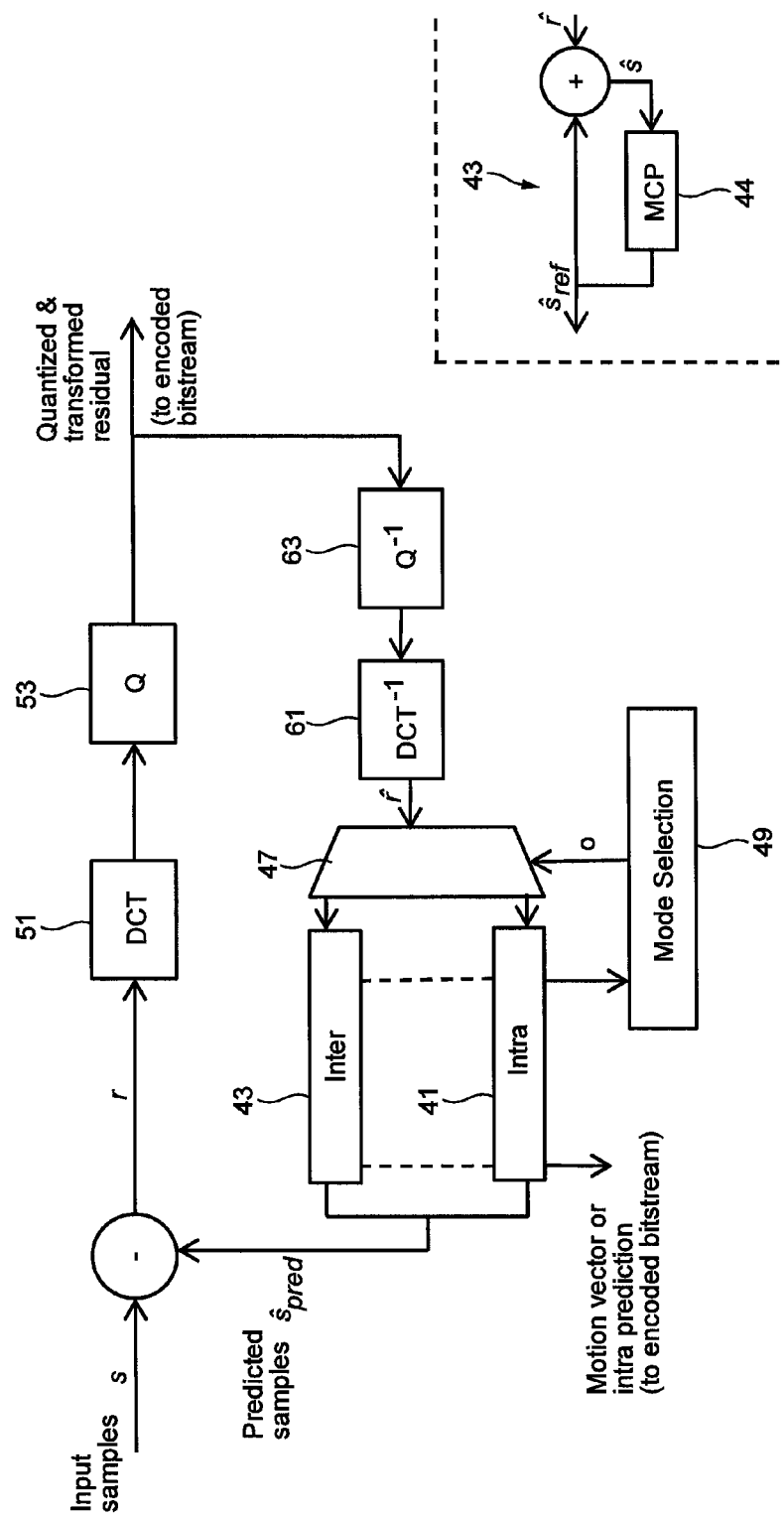
FIG. 3 is a schematic block diagram of an encoder.

FIG. 3 is a high-level block diagram schematically illustrating an encoder such as might be implemented on transmitting terminal 12. The encoder comprises: a discrete cosine transform (DCT) module 51, a quantizer 53, an inverse transform module 61, an inverse quantizer 63, an intra prediction module 41, an inter prediction module 43, and a subtraction stage (−). The encoder also comprises a switch 47 and mode selection module 49. Each of the modules is preferably implemented as a portion of code stored on the transmitting terminal's storage medium 14 and arranged for execution on its processing apparatus 16, though the possibility of some or all of these being wholly or partially implemented in dedicated hardware circuitry is not excluded.

Each of the switch 47 and mode selection module 49 is arranged to receive an instance of the input video stream comprising a plurality of macroblocks MB. The mode selection module 49 is arranged to select a coding mode "o" for each macroblock and is operatively coupled to the multiplexer 47 so as to control it to pass the output of the inverse quantizer 63 to the input of either the intra prediction module 41 or inter prediction module 43 as appropriate to the selected mode. The mode selection module 49 may also be arranged to indicate the selected mode "o" to the relevant prediction module 41, 43 (e.g. to indicate a 4×4 partition mode, 8×8 mode, skip mode, etc), and to receive information fed back from the prediction module 41, 43 for use in selecting the modes for the next frame. The output of the intra prediction module 41 or inter prediction module 43 is then coupled on to an input of the subtraction stage (−) which is arranged to receive the unencoded input video stream at its other input and subtract the predicted blocks from their unencoded counterparts, thus generating the residual signal. The residual blocks are then passed through the transform (DCT) module 51 where their residual values are converted into the frequency domain, then to the quantizer 53 where the transformed values are converted to discrete quantization indices. The quantized, transformed signal is fed back though the inverse quantizer 63 and inverse transform module 61 to generate a predicted version of the blocks or subblocks (as would be seen at the decoder) for use by the selected prediction module 41, 43. An indication of the predictions used in the prediction modules 41,43, the motion vectors generated by the inter prediction module 43 and the quantized, transformed indices of the residual as generated by the transform and quantization modules 51, 53 are all output for inclusion in the encoded video stream; typically via a further, lossless encoding stage such as an entropy encoder (not shown) where the prediction values and transformed, quantized indices may be further compressed using lossless encoding techniques known in the art.

The following describes a loss-adaptive rate-distortion process that, according to a preferred embodiment of the present invention, can be implemented in an encoder with reduced complexity relative to Zhang et al., requiring fewer processing cycles to perform and a reduced memory footprint to maintain the error propagation distortion map. The encoder is similar to that described in relation to FIG. 3, but with a modified mode selection module 49. It may be used to encode a video stream of the kind illustrated in FIG. 1, and implemented in a communication system such as that of FIG. 2.

As mentioned, mode selection may involve optimizing (e.g. minimizing) a Lagrangian type function:

$$J=D(m,o)+\lambda R(m,o), \quad (1)$$

where J represents the Lagrange function, D represents a measure of distortion (a function of mode o and macroblock m or macroblock sub-partition), R is the bitrate, and λ is a parameter defining a trade-off between distortion and rate.

In a conventional case the distortion term D only takes into account the source coding distortion, i.e. due to imperfections in the encoder such as the distortion introduced by quantization. It does not take into account the distortion that may be introduced due to loss of data over the channel, e.g. due to packet loss in transmission over a packet-based network 32.

On the other hand, loss adaptive techniques such as those of the present invention and Zhang et al. attempt to define a measure of "end-to-end" distortion taking into account both the source encoding and the distortion due to loss of data over the channel. The end-to-end distortion for a given (target) block, macroblock or subblock may be described as:

$$D=(1-p)D_{arrival}+pD_{loss} \quad (5)$$

where $D_{arrival}$ is an estimate of the distortion that will be experienced if the target block does arrive at the decoder, and $D_{loss}$ is an estimate of the distortion that will be experienced if the target block does not arrive at the decoder due to packet loss over the channel, e.g. due to loss of a packet comprising that block over a packet-based network 32. The parameter p is an estimate of the probability of a loss event occurring over the channel that results in the block or image portion in question being lost, e.g. an estimate of the probability of a packet loss. For convenience the term "block" may be used in places here to refer generally to the relevant level of frame partition (e.g. a block or subblock of certain standards such as H.264).

$D_{arrival}$ represents not only the source coding distortion but also the distortion that will be introduced due to distortion of a block's past, i.e. distortion in one or more reference blocks from which the target block is to be predicted. Therefore $D_{arrival}$ comprises both a source coding distortion term $D_s$ and an error propagation distortion term $D_{ef\_ref}$ which represents a distortion in the predicted target block's history (i.e. distortion in the target blocks' reference block which will carry forward into the target block):

$$D_{arrival}=D_s+D_{ep\_ref} \quad (6)$$

$D_{loss}$ comprises a loss due to concealment. If a target block is not received then the decoder will apply a concealment algorithm which could involve freezing a previously decoded block, or interpolating or extrapolating from one or more successfully decoded blocks (either from the current frame and/or a previous frame). Therefore $D_{loss}$ can be identified as the distortion due to this concealment process:

$$D_{loss}=D_{ec} \quad (7)$$

So examining equation (5), the term $D_s$ represents an estimate of the distortion that will be experienced if there is no loss at all, the term $D_{ec}$ represents an estimate of the distortion that will be experienced if the target block is lost, and the term $D_{ep\_ref}$ represents an estimate of the distortion that will be experienced if the target block is successfully received but something in its history is lost (if the target block's reference block is lost, or the reference block's reference block is lost, etc.)

$D_s$ and $D_{ep\_ref}$ are functions of encoding mode selection o. $D_{ec}$ is not a function of mode selection o and so is dropped from the Lagrange expression (it does not matter how a lost block was encoded—it is still lost). Hence the optimization can be written as:

$$o_{opt} = \operatorname*{argmin}_{o}(D_s(m, o) + D_{ep\_ref}(m, o) + \lambda R(m, o)), \quad (2)$$

$D_s$ is deterministic as it is based on information that can be known at the encoder, for example based on the difference between the raw input sample values s and the reconstructed sample values ŝ. The encoder runs a parallel instance of the decoder at the encoder side (or an approximation of it)—see the inset detailing the inter prediction module 43 in FIG. 3. The inter prediction module 43 comprises a motion compensation prediction (MCP) block 44 and addition stage (+) arranged to determine the reconstructed samples ŝ by combining the predicted samples $\hat{s}_{pred}$ and the reconstructed residual r̂, i.e. $\hat{s}_i=\hat{r}_i+\hat{s}_{pred}$ for each sample index i. In the case of inter encoding, at the encoder the predicted samples $\hat{s}_{pred}$ may be the same as the samples of the reference block $\hat{s}_{ref}$ (the reference block in the reference frame just being offset by the motion vector relative to the target frame—see FIG. 1c, to be discussed again shortly).

Hence the encoder can determine the difference between the actual samples s and the reconstructed samples ŝ as seen at the encoder and decoder end (this so far ignores the possibility of loss which will introduce further distortion experienced at the decoder). The difference in samples may be calculated for example as the sum square difference (SSD) error over all sample indices i of the target block in question:

$$D_s = \sum_i [(s_i - \hat{s}_i)^2] \qquad (8)$$

However, $D_{ep\_ref}$ remains to be estimated, which will be based on making some estimation concerning the channel over which the encoded data is to be transmitted (e.g. over packet-based network 32).

To achieve this, the mode selection module 49 in the encoder may be configured to maintain an error propagation distortion map $D_{ep}$ describing the distortion of each macroblock or partition of a macroblock within the most recently encoded frame. The mode selection module 49 is also arranged to determine a probability p that the packet containing the reference block from which a target block is to be predicted will be lost over the channel (and therefore also to implicitly or explicitly determine a probability 1−p that the packet does arrive). In a preferred embodiment the probability p is predetermined at the design stage based on statistical modelling, in which case the mode selection module 49 determines p by retrieving a value from memory 14. However, another possibility would be that the mode selection module 49 determines p based on feedback from the receiver 22.

The error propagation map may be expressed as:

$$D_{ep} = (1-p)D_{ep\_arrival} + pD_{loss} \qquad (9)$$

The error propagation map $D_{ep}$ comprises a distortion estimate for macroblock m or more preferably for each sub partition (block or sub-block) m(k) within the most recently encoded frame. Hence it may be more explicitly written as:

$$D_{ep}(m(k)) = (1-p)D_{ep\_arrival}(m(k)) + pD_{loss}(m(k)) \qquad (10)$$

where m(k) denotes the $k^{th}$ sub-partition (e.g. sub-block) of macroblock m and p the probability of packet loss.

$D_{loss}$ is equal to $D_{ec}$ as discussed above. $D_{ep\_arrival}$ represents the differences over the channel, i.e. the difference between the reconstructed samples at the encoder and the reconstructed at the decoder. For example this could be quantified in terms of the sum of squared differences (SSD):

$$D_{ep\_arrival} = \sum_i (\hat{s}_i - \tilde{s}_i)^2 \qquad (11)$$

where $\tilde{s}_i$ are the samples (of indices i) received at the decoder taking into account both the source coding distortion and the distortion due to the channel. I.e. $s_i$ are the raw unencoded input samples, $\hat{s}_i$ are the reconstructed samples at the encoder taking into account the source coding distortion (e.g. due to quantization), and $\tilde{s}_i$ are the samples taking into account the total end-to-end distortion including the lossy effect of the channel; $s_i \to \hat{s}_i \to \tilde{s}_i$.

$D_{ep\_arrival}$ can be expanded to:

$$D_{ep\_arrival} = \sum_i ((\hat{s}_{ref} + \hat{r}_i) - (\tilde{s}_{ref} + \hat{r}_i))^2 \qquad (12)$$

where $\hat{r}_i$ are the samples of the reconstructed residual. Therefore:

$$D_{ep\_arrival} = \sum_i (\hat{s}_{ref} - \tilde{s}_{ref})^2 = D_{ep\_ref} \qquad (13)$$

So substituting into equation (9), the error propagation map can be rewritten as:

$$D_{ep} = (1-p)D_{ep\_ref} + pD_{ec} \qquad (14)$$

or:

$$D_{ep}(m(k)) = (1-p)D_{ep\_ref}(m(k)) + pD_{ec}(m(k)) \qquad (15)$$

Considering the mode optimization problem, it may also be written:

$$D_{ep}(m(k),n+1) = (1-p)D_{ep\_ref}(m(k),n,o_{opt}) + pD_{ec}(m(k),n,o_{opt}) \qquad (16)$$

where n is the frame number, i.e. $D_{ep}(n+1)$ is the error propagation map to be used for making the mode selection for frame at a time n+1 given the existing decision $o_{opt}$ and distortion $D_{ep}(n)$ map for frame at a preceding time n.

As in Zhang et al., the $D_{ec}$ term may be also expanded:

$$D_{ep}(m(k),n+1) = (1-p)D_{ep\_ref}(m(k),n,o_{opt}) + p(D_{ec\text{-}rec}(m(k),n,o_{opt}) + D_{ec\text{-}ep}(m(k),n)), \qquad (3)$$

where $D_{ec\text{-}rec}$ denotes the SSD between the reconstructed and error concealed pixels in the encoder, and $D_{ec\text{-}ep}$ the expected SSD between the error concealed pixels in the encoder and decoder.

Examining equation (3), as explained above, the term $D_{ep\_ref}$ represents the distortion that will be experienced if the target block is successfully received but something in its history is lost (if the target block's reference block is lost, or the reference block's reference block is lost, etc.). Further, $D_{ec\text{-}rec}$ represents an estimate of the distortion due to the nature of the concealment algorithm itself (somewhat analogous to the intrinsic source coding distortion $D_s$ for prediction). $D_{ec\text{-}ep}$ then represents an estimate of the distortion that will be experienced if both the target block is lost (and so needs to be concealed at the decoder) and something in the concealed target block's history is lost (if the block from which concealment is done is lost, or the block from which that block is predicted or concealed is lost, etc.).

So the distortion map $D_{ep}$ comprises a contribution due to new loss, resulting from $D_{ec\text{-}rec}$ and in part from $D_{ec\text{-}ep}$; and a contribution due to past loss, resulting from $D_{ep\_ref}$ and in part also from $D_{ec\text{-}ep}$.

For the first frame in a sequence the frame will be coded with intra coding, in which case $D_{ep\_ref} = 0$ and therefore $D_{ep} = pD_{ec}$.

The error concealment distortion $D_{ec}$ is calculated by the mode selection module 49. The term $D_{ec\text{-}rec}$ is based on knowledge of the concealment algorithm, and may depend on the particular error concealment algorithm used. $D_{ec\text{-}ep}$ is calculated based on the existing (most recent) distortion map in a manner analogous to $D_{ep\_ref}$, e.g. by copying the distortion of a co-located block in the case of a basic concealment algorithm or calculating a weighted sum of the distortions from multiple previously encoded blocks b1-b4 if a more complex concealment is used that attempts to extrapolate motion (by analogy see discussion in relation to FIG. 1c below). Other ways of calculating $D_{ec}$ could be used—this could be any estimation of a difference between the reconstructed samples in the encoder and the error concealed samples as would be seen ay the decoder (i.e. the samples copied, interpolated or extrapolated from a previous received frame or a received region of the same frame to conceal the lost frame or region).

The mode selection module 49 then maintains the error propagation map for each subsequent inter predicted frame by updating it following each mode selection decision, now including a calculation of $D_{ep\_ref}$ from knowledge of the existing error map. In the case of inter prediction (motion estimation), according to Zhang et al. this is done using the motion vectors for the frame in question.

Figure 1A:
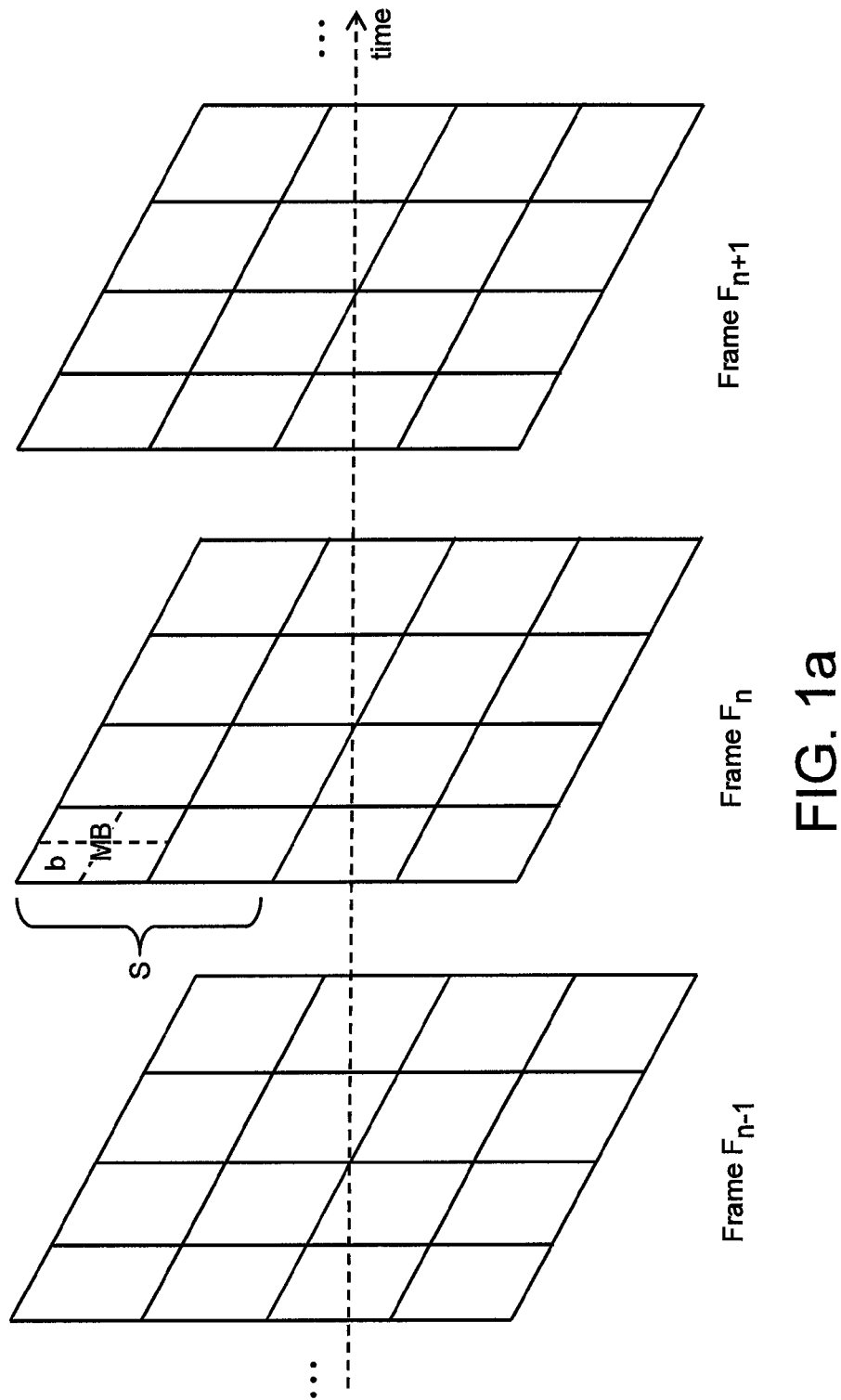
FIG. 1a is a schematic representation of a video stream.

An example of this is illustrated in FIG. 1c. Four example blocks b1, b2, b3 and b4 are shown in a reference frame $F_n$ (at time n−1), the reference frame having already been encoded. The blocks of the target frame $F_n$ (at a subsequent time n) are to be predicted from the reference frame $F_{n-1}$. For example consider a target block $b_1$ in the target frame $F_n$. To this end the motion prediction module 44 determines a motion vector defining an offset between the target block in the target frame $F_n$ and a reference block (shown by the dotted line) in the reference frame $F_{n-1}$, such that when the reference block is translated from the offset position in the reference frame $F_{n-1}$ into the position of the target block $b_1'$ in the target frame $F_n$ it provides a best estimate of the target block $b_1$. Note therefore that the dotted reference block is not necessarily an indexable block in the reference frame $F_{n-1}$, i.e. is not necessarily a predetermined subdivision of the reference frame, and may be offset by any arbitrary amount (and in fact may even be offset by a fractional number of pixels). Hence the reference block is made up of a contribution from four actual indexable blocks b1, b2, b3 and b4.

Accordingly, the existing calculation performed by the mode selection module 49 to determine $D_{ep\_ref}$ for use in the update of the error propagation map $D_{ep}(n+1)$ comprises calculating a weighted sum of the distortions recorded for blocks or subblocks b1 to b4 in the existing map $D_{ep}(n)$:

$$D_{ep\_ref} = \sum_{i=1}^{4} w_i D_{ep}(i) \tag{17}$$

Or more explicitly:

$$D_{ep\_ref}(m(k), n) = \sum_{i=1}^{4} w_i D_{ep}(b_i, n-1), \tag{4a}$$

where $w_i$ is the weight representing the contribution from block or subblock $b_i$ and $D_{ep}(i)$ is the error propagation map entry for block or subblock $b_i$.

The above describes an existing process of determining an initial error propagation map $D_{ep}$, using the error propagation map to select an optimal coding mode decision $o_{opt}$ for a subsequent coding, using the coding decision to update the map $D_{ep}$, then using the updated map in the next coding decision, and so forth, wherein the error propagation map represents an end-to-end distortion including an estimated effect of loss over the channel E.g. reference is made again to Zhang et al. This may be referred to herein as loss-adaptive rate-distortion optimization (LARDO).

However, there is a problem with existing LARDO techniques in that they have a high processing complexity, i.e. incur a large number of processing cycles. They also require a relatively high memory footprint to maintain all of the values in the error propagation distortion map $D_{ep}$. On some platforms both the computational and memory resources may be very limited. It would therefore be desirable to provide a simplification to the algorithm described in the system of Zhang et al., resulting in lower computational complexity and memory requirement at a sometimes affordable reduction in performance.

According to a preferred embodiment of the present invention, this may be achieved by assuming zero motion for the computation of the error propagation reference distortion (regardless of whether there is actual motion occurring in the video image being captured). This allows both memory and computations to be saved since it is not necessary to compute the weights to perform a calculation based on the motion vectors, and only one value of $D_{ep}$ need be stored per macroblock (e.g. instead of 16 if one considers a 4×4 grid). Naturally, the end-to-end rate-distortion performance may drop, but in some conditions the drop in quality will be small and acceptable.

Figure 4:
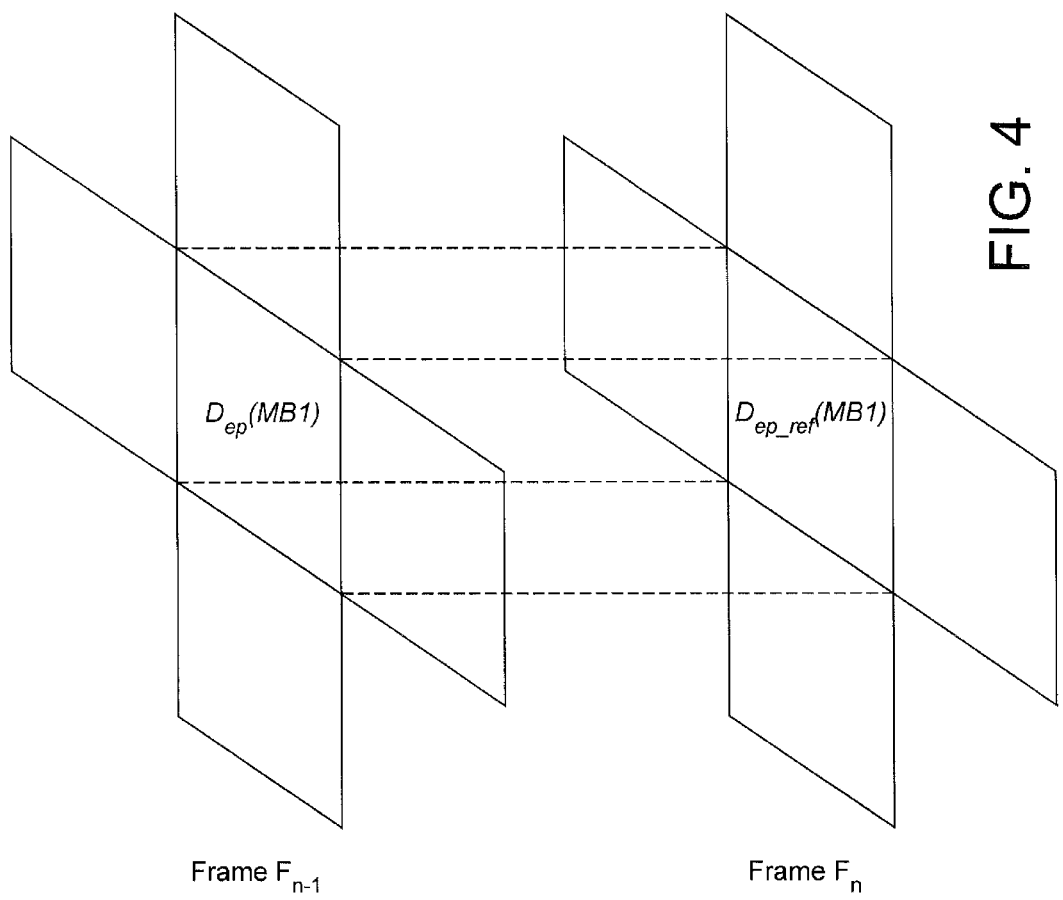
FIG. 4 is a schematic representation of an alternative calculation of error propagation distortion.

FIG. 4 provides a schematic illustration of a reduced complexity technique for the computation of the expected error-propagation reference distortion and an expected error-propagation distortion map, to be contrasted against the higher complexity version of FIG. 1c.

The main simplifying approximation here is to ignore the effect of motion. This means that instead of the weighted sum of equation (4) and FIG. 1c, the bias term $D_{ep\_ref}$ for a particular macroblock m is constrained to being determined from a co-located macroblock in the error propagation map:

$$D_{ep\_ref}(m,n,o=\text{INTER})=D_{ep}(m,n,o=\text{INTER}) \tag{18}$$

The constraint is applied in the mode selection process even if motion is really occurring in the video, and even if motion is being estimated for the sake of the inter prediction encoding itself.

Also, although it has been mentioned above that a number of different concealment techniques exist, another approximation that can be made relating to the assumption of zero motion is that the concealment of a lost macroblock is based on a co-located macroblock from a preceding frame without extrapolation or interpolation from adjacent image portions. To help minimise complexity, preferably the concealment works (or at least is assumed to work) by taking a direct frame copy of a previously received portion (or looked at another way, freezing the previously received portion). That is, copied directly from previous frame without any attempt to interpolate from the copied frame. These approximations mean:

$$D_{ec-ep}=D_{ep}. \tag{19}$$

Therefore substituting (18) and (19) into equation (3) this yields:

$$D_{ep}=D_{ep}(m,n)+p(D_{ec-rec}(m,n,opt)) \tag{20}$$

Further, for intra coding:

$$D_{ep}=pD_{ep}(m,n)+p(D_{ec-rec}(m,n,o_{opt})) \tag{21}$$

So bringing these points together, assuming zero motion both for $D_{ep\_ref}$ and $D_{ec-ep}$ yields $D_{ep\_ref}(m,n,o=\text{INTER})=$ $D_{ep}$(m,n,o=INTER) and $D_{ec\text{-}ep}$(m,n)=$D_{ep}$(m,n) respectively, and the modified version of equation (3) can be expressed as:

$$D_{ep}(m, n+1) = \begin{cases} D_{ep}(m,n) + pD_{ec\text{-}rec}(m,n,o_{opt}) & \text{if } o_{opt} = \text{INTER} \\ pD_{ep}(m,n) + pD_{ec\text{-}rec}(m,n,o_{opt}) & \text{if } o_{opt} = \text{INTRA}. \end{cases} \quad (22)$$

This form of the calculation advantageously reduces complexity because the weights $w_1 \ldots w_4$, motion vector and the weighted sum based on these are not required for the purpose of computing the error propagation reference distortion (even though the motion vectors may still be being used in the prediction).

Further, as also illustrated in FIG. 4, note that above calculations are preferably now performed on a macroblock-by-macroblock basis, i.e. only one value for each distortion term need be calculated per macroblock, not per block or sub-block. Also, it is no longer necessary to store the error propagation distortion map on a finer grid, and only one distortion value needs to be stored in the distortion map per macroblock. The granularity of k has become redundant for the purpose of LARDO. This is because with no motion prediction, this being the process that is typically done on a block-by-block basis, there is no need to have that level of granularity in order to estimate the effect of motion prediction on the distortion. Further the choice of encoding mode o is typically always performed per macroblock (a given macroblock is encoded using the same mode over the whole macroblock). Further, loss typically always occurs over a whole macroblock (partial loss of a macroblock never occurs) and concealment is performed over an area of at least a macroblock. Therefore only a macroblock resolution is needed for the purpose of LARDO.

Hence the calculation is simplified and the memory footprint is reduced since only one value of $D_{ep}$ need be stored per macroblock.

It will be appreciated that the above embodiments have been described only by way of example.

Although the above-described embodiments operate on a macroblock-by-macroblock basis, this is not necessarily the case. More generally other partitions of the distortion map are possible, even to an extreme case where the distortion map is split into only two portions, e.g. one for the foreground of an image (where more motion typically occurs) and one for the background (where little motion is likely to occur), with one encoding mode selection being made for the foreground and another for the background. In another example, different levels of precision could be applied to different regions of the image, for example by applying an object-identification algorithm to identify certain objects that require different treatment, e.g. so that certain objects such as faster-moving objects are given a higher granularity in the distortion map and mode selection process than the background and/or than certain other objects such as slower-moving objects.

Note also that the prediction block granularities do not have to be the same as or even connected to the distortion map granularity (though that possibility is not excluded).

Generally, while the above has been described in terms of slices, macroblocks and blocks or sub-blocks, these terms are not necessarily intended to be limiting and the ideas described herein are not limited to any particular way of dividing or subdividing a frame. Further, the distortion map may cover a whole frame or a region within a frame, and coding decision process may be applied over the whole frame or only for a region within a frame.

In some embodiments, the encoder may be configured to operate in two different complexity modes, one in which the lower complexity no-motion approximation is used and another mode using a higher-complexity (but more accurate) process such as that of Zhang et al. Different modes could be applied to different regions of the video image, for example a different mode for foreground and background, or by using an object recognition algorithm to identify or distinguish between moving and/or stationary objects e.g. which could be suited to the higher and lower complexity modes respectively.

Further, although it is preferred that the distortion map stores only one variable per macroblock or image portion, and the estimate of distortion for use in the mode selection decision is preferably based on only that one variable per macroblock or corresponding image portion, in other embodiments it could still be that the distortion map portions have a finer granularity than the portions for which encoding modes are selected—e.g. if such granularity was desired for use in some other aspect of the encoding, or because sub-block granularity is maintained to support different complexity modes. Even if this is the case, a processing complexity saving may still be achieved to some extent as long as the image portion for which the distortion measure is being determined is co-located with the corresponding portion of the distortion map from which it is determined, because the weighting process based on a motion vector would still not required. For example, if the macroblock bias term $D_{ep\_ref}$ was calculated from an average of 16 (4×4) sub-block values, this would still avoid the needs for weights. Or if $D_{ep\_ref}$ was calculated for each block or sub-block and then combined or considered together in the mode selection process, again this would still save on the weighting process.

Note also that another way of constraining to a co-located blocks is to set all weights $w_1 \ldots w_4$ but one to zero.

The sum of squared differences (SSD) is often preferred as measure of difference since it results in higher quality compared to sum of absolute differences (SAD), but the latter possibility or other possibilities are not excluded and generally the invention could be implemented using any measure of difference between samples as a basis for quantifying distortion.

Commonly, the measure of rate also accounts for coding of all needed parameters, including parameters describing prediction and quantized transform coefficients. This kind of optimization may be referred to herein as full rate-distortion optimization (RDO). In lower complexity embodiments however, the distortion and/or rate term may be approximated by only taking into account the effect of some but not all processing stages, e.g. only taking into account the effect of prediction.

Further, where the present invention is described in terms of two frames n and n+1, according to certain embodiments of the invention it is not necessary for these to refer to two adjacent frames (though that may be the case in existing codecs). In some embodiments it is possible that inter prediction could be performed relative to an even earlier frame, and as such n and n+1 may be used in relation to the present invention to refer respectively to any previously encoded frame or image portion and a subsequent frame or portion to be predicted from it.

Note again that where a contribution due to loss is mentioned in this application, or anything stating what happens "if" data lost over the channel or such like, this only relates to a probabilistic assumption (e.g. p) made by the encoder about what might be experienced by the decoder—the encoder of course does not know what will happen. The probabilistic assumption may be predetermined at the design stage based on statistical network modelling, and/or could even be determined dynamically based on feedback from the decoder.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

Other variants may become apparent to a person skilled in the art given the disclosure herein. The scope of the invention is not limited by the described embodiments but only by the appendant claims.

What is claimed is:

1. A method of encoding a video stream comprising a plurality of frames, the method comprising:
    for each of a plurality of target image portions to be encoded in a frame, selecting a preferred one of a set of encoding modes by optimizing a function comprising an estimate of distortion for the target image portion and a measure of bit rate required to encode the target image portion, and encoding the target image portion into the encoded video stream using the selected encoding mode;
    transmitting the encoded video stream over a lossy channel; and
    maintaining an error propagation distortion map which comprises a plurality of error propagation distortion values mapping to respective frame partitions, the error propagation distortion values being based on previous encoding mode selections;
    wherein the estimate of distortion used to select the encoding mode for each of the target image portions is based on a corresponding portion from the error propagation distortion map;
    wherein said corresponding portion is constrained to being co-located with the target image portion; and
    wherein the method further comprises updating the error propagation distortion map after the encoding mode selection for the target image portions, and using the updated map to determine a subsequent encoding mode selection for each of the target image portions; and
    wherein the update of the error propagation map comprises a lower complexity calculation as a result of said constraint, relative to a case where the corresponding portion is based on a weighted sum of the error propagation distortion values from a plurality of said frame partitions.

2. The method of claim 1, wherein each of said frame partitions is the same size as a respective one of the target image portions, such that said corresponding portion is one of said frame partitions.

3. The method of claim 1, wherein the error propagation map maintains only one error propagation distortion value per frame partition.

4. The method of claim 2, wherein the estimate of distortion is based on the error propagation distortion value of only the co-located one of said frame partitions.

5. The method of claim 1, wherein each of said image portions is a macro block, each of the frame partitions is a macroblock, the error propagation map maintains only one estimate of distortion value per macro block, and the estimate of distortion is based on the error propagation distortion value of only the co-located macro block.

6. The method of claim 1, wherein the estimate of distortion comprises a first term representing source coding distortion, and a bias term representing an estimate of distortion that would be experienced due to loss over said channel; wherein the bias term is based on said corresponding portion from the error propagation distortion map.

7. The method of claim 6, wherein the bias term is set equal to the error propagation distortion value for the corresponding co-located portion.

8. The method of claim 6, wherein to maintain the error propagation distortion map, the error propagation distortion value for a frame partition of a current frame is based on a contribution from the error propagation distortion value for that frame partition in a preceding frame and on a contribution representing an estimate of distortion that would be experienced due to concealment in event of loss over said channel.

9. The method of claim 8, wherein the concealment term is determined based on an assumption that, in event of loss of a target image portion, the concealment copies the target image portion directly from a co-located portion of a preceding frame.

10. The method of claim 8, comprising determining a probability p that a packet will be lost over the channel, wherein the concealment term is weighted by a factor of p.

11. The method of claim 6, wherein the selected encoding mode $O_{opt}$ is calculated by:

$$o_{opt} = \underset{o}{\operatorname{argmin}}(D_s(m, o) + D_{ep\_ref}(m, o) + \lambda R(m, o)),$$

where $D_s(m,o)+D_{ep\_ref}(m,o)+\lambda R(m,o)$ is said function, $D_s$ is the first term, $D_{ep\_ref}(m,o)$ is the bias term, R(o) is the bitrate, $\lambda$ is a factor representing a trade-off between distortion and bitrate, and m is an index of the target image portion.

12. The method of claim 1, wherein the encoding modes comprise at least (i) an intra frame mode which encodes the target image portion relative to a reference image portion in the same frame, and (ii) an inter frame encoding mode which encodes the target image portion relative to a reference image portion in a previously encoded frame.

13. The method of claim 6, wherein:
    to maintain the error propagation distortion map, the error propagation distortion value for a frame partition of a current frame is based on a contribution from the error propagation distortion value for that frame partition in a preceding frame and on a contribution representing an estimate of distortion that would be experienced due to concealment in event of loss over said channel;

the encoding modes comprise at least (i) an intra frame mode which encodes the target image portion relative to a reference image portion in the same frame, and (ii) an inter frame encoding mode which encodes the target image portion relative to a reference image portion in a previously encoded frame;

the selected encoding mode $o_{opt}$ is calculated by:

$$o_{opt} = \mathrm{argmin}_{o}(D_s(m, o) + D_{ep\_ref}(m, o) + \lambda R(m, o)),$$

where $D_s(m,o) + D_{ep\_ref}(m,o) + \lambda R(m,o)$ is said function, $D_s$ is the first term, $D_{ep\_ref}(m,o)$ is the bias term, R(o) is the bitrate, $\lambda$ is a factor representing a trade-off between distortion and bitrate, and m is an index of the target image portion;

the method comprises determining a probability p that a packet will be lost over the channel, wherein the concealment term is weighted by a factor of p; and the error propagation distortion map is calculated by:

$$D_{ep}(m, n+1) = \begin{cases} D_{ep}(m, n) + pD_{ec-rec}(m, n, o_{opt}) & \text{if } o_{opt} = \text{INTER} \\ pD_{ep}(m, n) + pD_{ec-rec}(m, n, o_{opt}) & \text{if } o_{opt} = \text{INTRA} \end{cases}$$

where m is the $m^{th}$ image portion, and $D_{ec-rec}$ is the contribution due to concealment.

14. The method of claim 1, wherein the set of encoding modes comprises a skip mode.

15. The method of claim 1, wherein the set of encoding modes comprises modes using different partitions of the target image portion for at least one of intra and inter frame encoding.

16. A computer program product for encoding a video stream comprising a plurality of frames, the computer program product being embodied on a computer-readable storage memory device and comprising code configured so as when executed to perform the operations comprising:

for each of a plurality of target image portions to be encoded in a frame, selecting a preferred one of a set of encoding modes by optimizing a function comprising an estimate of distortion for the target image portion and a measure of bit rate required to encode the target image portion, and encoding the target image portion into the encoded video stream using the selected encoding mode;

transmitting the encoded video stream over a lossy channel; and maintaining an error propagation distortion map which comprises a plurality of error propagation distortion values mapping to respective frame partitions, the error propagation distortion values being based on previous encoding mode selections;

wherein the estimate of distortion used to select the encoding mode for each of the target image portions is based on a corresponding portion from the error propagation distortion map;

wherein said corresponding portion is constrained to being co-located with the target image portion; and wherein the code is configured so as when executed to update the error propagation distortion map after the encoding mode selection for the target image portions, and use the updated map to determine a subsequent encoding mode selection for each of the target image portions; and wherein the update of the error propagation map comprises a lower complexity calculation as a result of said constraint, relative to a case where the corresponding portion is based on a weighted sum of the error propagation distortion values from a plurality of said frame partitions.

17. The computer program product of claim 16, wherein the code is configured such that when executed each of said frame partitions is the same size as a respective one of the target image portions, such that said corresponding portion is one of said frame partitions.

18. The computer program product of claim 16, wherein the code is configured such that when executed the error propagation map maintains only one error propagation distortion value per frame partition.

19. The computer program product of claim 18, wherein the code is configured such that when executed the estimate of distortion is based on the error propagation distortion value of only the co-located one of said frame partitions.

20. An apparatus for encoding a video stream comprising a plurality of frames, the apparatus comprising:

an encoder arranged, for each of a plurality of target image portions to be encoded in a frame, to select a preferred one of a set of encoding modes by optimizing a function comprising an estimate of distortion for the target image portion and a measure of bit rate required to encode the target image portion, and to encode the target image portion into the encoded video stream using the selected encoding mode; and a transmitter for transmitting the encoded video stream over a lossy channel; and wherein the encoder is configured to maintain an error propagation distortion map which comprises a plurality of error propagation distortion values mapping to respective frame partitions, the error propagation distortion values being based on previous encoding mode selections, and the estimate of distortion used to select the encoding mode for each of the target image portions being based on a corresponding portion from the error propagation distortion map;

wherein the encoder is configured to constrain said corresponding portion to being co-located with the target image portion;

wherein the encoder is configured to update the error propagation distortion map after the encoding mode selection for the target image portions, and use the updated map to determine a subsequent encoding mode selection for each of the target image portions; and wherein the update of the error propagation map comprises a lower complexity calculation as a result of said constraint, relative to a case where the corresponding portion is based on a weighted sum of the error propagation distortion values from a plurality of said frame partitions.

21. The apparatus of claim 20, wherein the encoder is configured such that each of said frame partitions is the same size as a respective one of the target image portions, such that said corresponding portion is one of said frame partitions.

22. The apparatus of claim 20, wherein the encoder is configured such that the error propagation map maintains only one error propagation distortion value per frame partition.

23. The apparatus of claim 22, wherein the encoder is configured such that the estimate of distortion is based on the error propagation distortion value of only the co-located one of said frame partitions.

24. A method of encoding a video stream comprising a plurality of frames, the method comprising:

for each of a plurality of target image portions to be encoded in a frame, selecting a preferred one of a set of encoding modes by optimizing a function comprising an estimate of distortion for the target image portion and a measure of bit rate required to encode the target image portion, and encoding the target image portion into the encoded video stream using the selected encoding mode;

transmitting the encoded video stream over a lossy channel; and maintaining an error propagation distortion map which comprises a plurality of error propagation distortion values mapping to respective frame partitions, the error propagation distortion values being based on previous encoding mode selections;

wherein the estimate of distortion used to select the encoding mode for each of the target image portions is based on a corresponding portion from the error propagation distortion map;

wherein said corresponding portion is constrained to being co-located with the target image portion, wherein the estimate of distortion comprises a first term representing source coding distortion, and a bias term representing an estimate of distortion that would be experienced due to loss over said channel; wherein the bias term is based on said corresponding portion from the error propagation distortion map, wherein the bias term is set equal to the error propagation distortion value for the corresponding co-located portion.

25. A method of encoding a video stream comprising a plurality of frames, the method comprising:

for each of a plurality of target image portions to be encoded in a frame, selecting a preferred one of a set of encoding modes by optimizing a function comprising an estimate of distortion for the target image portion and a measure of bit rate required to encode the target image portion, and encoding the target image portion into the encoded video stream using the selected encoding mode;

transmitting the encoded video stream over a lossy channel; and maintaining an error propagation distortion map which comprises a plurality of error propagation distortion values mapping to respective frame partitions, the error propagation distortion values being based on previous encoding mode selections;

wherein the estimate of distortion used to select the encoding mode for each of the target image portions is based on a corresponding portion from the error propagation distortion map;

wherein said corresponding portion is constrained to being co-located with the target image portion, wherein the estimate of distortion comprises a first term representing source coding distortion, and a bias term representing an estimate of distortion that would be experienced due to loss over said channel; wherein the bias term is based on said corresponding portion from the error propagation distortion map, wherein to maintain the error propagation distortion map, the error propagation distortion value for a frame partition of a current frame is based on a contribution from the error propagation distortion value for that frame partition in a preceding frame and on a contribution representing an estimate of distortion that would be experienced due to concealment in event of loss over said channel, wherein the concealment term is determined based on an assumption that, in event of loss of a target image portion, the concealment copies the target image portion directly from a co-located portion of a preceding frame.

26. A method of encoding a video stream comprising a plurality of frames, the method comprising:

for each of a plurality of target image portions to be encoded in a frame, selecting a preferred one of a set of encoding modes by optimizing a function comprising an estimate of distortion for the target image portion and a measure of bit rate required to encode the target image portion, and encoding the target image portion into the encoded video stream using the selected encoding mode;

transmitting the encoded video stream over a lossy channel; and maintaining an error propagation distortion map which comprises a plurality of error propagation distortion values mapping to respective frame partitions, the error propagation distortion values being based on previous encoding mode selections;

wherein the estimate of distortion used to select the encoding mode for each of the target image portions is based on a corresponding portion from the error propagation distortion map;

wherein said corresponding portion is constrained to being co-located with the target image portion, wherein the estimate of distortion comprises a first term representing source coding distortion, and a bias term representing an estimate of distortion that would be experienced due to loss over said channel; wherein the bias term is based on said corresponding portion from the error propagation distortion map, wherein the selected encoding mode $o_{opt}$ is calculated by:

$$o_{opt} = \arg\min_{o}(D_s(m, o) + D_{ep\_ref}(m, o) + \lambda R(m, o)),$$

where $D_s(m,o)+D_{ep\_ref}(m,o)+\lambda R(m,o)$ is said function, $D_s$ is the first term, $D_{ep\_ref}(m, o)$ is the bias term, R(o) is the bitrate, $\lambda$ is a factor representing a trade-off between distortion and bitrate, and m is an index of the target image portion.

27. A method of encoding a video stream comprising a plurality of frames, the method comprising:

for each of a plurality of target image portions to be encoded in a frame, selecting a preferred one of a set of encoding modes by optimizing a function comprising an estimate of distortion for the target image portion and a measure of bit rate required to encode the target image portion, and encoding the target image portion into the encoded video stream using the selected encoding mode;

transmitting the encoded video stream over a lossy channel; and maintaining an error propagation distortion map which comprises a plurality of error propagation distortion values mapping to respective frame partitions, the error propagation distortion values being based on previous encoding mode selections;

wherein the estimate of distortion used to select the encoding mode for each of the target image portions is based on a corresponding portion from the error propagation distortion map;

wherein said corresponding portion is constrained to being co-located with the target image portion, wherein the estimate of distortion comprises a first term representing source coding distortion, and a bias term representing an estimate of distortion that would be experienced due to loss over said channel; wherein the bias term is based on said corresponding portion from the error propagation distortion map, wherein:

to maintain the error propagation distortion map, the error propagation distortion value for a frame partition of a current frame is based on a contribution from the error propagation distortion value for that frame partition in a preceding frame and on a contribution representing an estimate of distortion that would be experienced due to concealment in event of loss over said channel;

the encoding modes comprise at least (i) an intra frame mode which encodes the target image portion relative to a reference image portion in the same frame, and (ii) an inter frame encoding mode which encodes the target image portion relative to a reference image portion in a previously encoded frame;

the selected encoding mode $o_{opt}$ is calculated by:

$$o_{opt} = \operatorname*{argmin}_{o}(D_s(m, o) + D_{ep\_ref}(m, o) + \lambda R(m, o)),$$

where $D_s(m,o)+D_{ep\_ref}(m,o)+\lambda R(m,o)$ is said function, $D_s$ is the first term, $D_{ep\_ref}(m, o)$ is the bias term, $R(o)$ is the bitrate, $\lambda$ is a factor representing a trade-off between distortion and bitrate, and m is an index of the target image portion;

the method comprises determining a probability p that a packet will be lost over the channel, wherein the concealment term is weighted by a factor of p; and the error propagation distortion map is calculated by:

$$D_{ep}(m, n+1) = \begin{cases} D_{ep}(m, n) + pD_{ec-rec}(m, n, o_{opt}) & \text{if } o_{opt} = \text{INTER} \\ pD_{ep}(m, n) + pD_{ec-rec}(m, n, o_{opt}) & \text{if } o_{opt} = \text{INTRA} \end{cases}$$

where m is the $m^{th}$ image portion, and $D_{ec-rec}$ is the contribution due to concealment.

* * * * *